United States Patent
Popp et al.

(10) Patent No.: US 6,255,790 B1
(45) Date of Patent: Jul. 3, 2001

(54) VEHICLE SEAT WITH A CONTROL DEVICE

(75) Inventors: Peter Popp, Regensburg; Günther Heitzer, Pfatter; Ralf-Johannes Lenninger, Donaustauf, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/316,476

(22) Filed: May 21, 1999

Related U.S. Application Data

(63) Continuation of application No. PCT/DE97/02741, filed on Nov. 21, 1997.

(30) Foreign Application Priority Data

Nov. 21, 1996 (DE) .............................................. 196 48 268

(51) Int. Cl.[7] .................................................. H02P 3/20
(52) U.S. Cl. ........................ 318/280; 318/286; 318/562; 318/563; 318/565; 318/568; 307/9.1; 307/10.1; 340/438
(58) Field of Search .................................... 307/9.1, 10.1; 318/562, 563, 565, 286, 568; 297/344.17, 344.2, 344.23, 330; 340/438

(56) References Cited

U.S. PATENT DOCUMENTS

| | | | |
|---|---|---|---|
| 4,888,535 | * 12/1989 | Brusasco | 318/568.1 |
| 5,019,759 | 5/1991 | Takemura et al. | |
| 5,319,248 | * 6/1994 | Endou | 307/10.1 |
| 5,558,370 | * 9/1996 | Behr | 280/806 |
| 5,590,904 | * 1/1997 | Ellis et al. | 280/742 |
| 5,612,876 | * 3/1997 | Zeidler | 364/424.005 |
| 5,653,462 | * 8/1997 | Breed et al. | 280/735 |
| 5,670,853 | * 9/1997 | Bauer | 318/286 |
| 5,696,409 | * 12/1997 | Handman et al. | 307/10.1 |
| 5,770,997 | * 6/1998 | Kleinberg et al. | 340/438 |
| 5,882,084 | * 3/1999 | Verellen et al. | 297/478 |
| 5,890,779 | * 4/1999 | Blackburn et al. | 307/10.1 |
| 5,925,084 | * 7/1999 | Gotoh et al. | 701/45 |
| 5,944,135 | * 8/1999 | Blackburn et al. | 180/268 |
| 5,947,514 | * 9/1999 | Keller et al. | 280/742 |
| 5,948,031 | * 9/1999 | Jinno et al. | 701/45 |
| 5,954,360 | * 9/1999 | Griggs, III et al. | 280/735 |
| 5,964,815 | * 10/1999 | Wallace et al. | 701/45 |
| 5,964,816 | * 10/1999 | Kincaid | 701/45 |
| 5,965,827 | * 10/1999 | Stanley et al. | 73/862.391 |
| 5,966,784 | * 10/1999 | Arbogast et al. | 24/633 |
| 5,967,549 | * 10/1999 | Allen et al. | 280/735 |
| 5,971,431 | * 10/1999 | Wohllebe et al. | 280/732 |
| 5,975,565 | * 11/1999 | Cuevas | 280/730.1 |
| 5,975,568 | * 11/1999 | Speckhart et al. | 280/735 |
| 6,074,009 | * 6/2000 | Farino | 297/378.14 |

FOREIGN PATENT DOCUMENTS

| | | |
|---|---|---|
| 3609688A1 | 9/1986 | (DE) . |
| 3730468A1 | 3/1989 | (DE) . |
| 4029683A1 | 3/1992 | (DE) . |
| 4222595A1 | 1/1993 | (DE) . |
| 4410402A1 | 9/1994 | (DE) . |
| 4339113A1 | 5/1995 | (DE) . |
| 4409046A1 | 9/1995 | (DE) . |
| 0030925A1 | 6/1981 | (EP) . |
| 0448829A2 | 10/1991 | (EP) . |
| 2060944A | 5/1981 | (GB) . |
| 2212629A | 7/1989 | (GB) . |

\* cited by examiner

*Primary Examiner*—Robert E. Nappi
*Assistant Examiner*—Tyrone Smith
(74) *Attorney, Agent, or Firm*—Herbert L. Lerner; Laurence A. Greenberg; Werner H. Stemer

(57) ABSTRACT

A control device, disposed in or on a vehicle seat, which has a pickup for detecting seat occupation, a pickup for detecting a position of the vehicle seat, a common control circuit, and an energy supply for the control circuit. The pickup for detecting seat occupation and the pickup for detecting the position of the vehicle seat are connected electrically conductively with the common control circuit.

10 Claims, 3 Drawing Sheets

VEHICLE SEAT WITH A CONTROL DEVICE

CROSS-REFERENCE TO RELATED APPLICATION

This application is a continuation of copending International Application No. PCT/DE97/02741, filed Nov. 21, 1997, which designated the United States.

BACKGROUND OF THE INVENTION

Field of the Invention

The invention relates to a vehicle seat with a control device.

The number of electronic controls with associated sensors and actuators in motor vehicles has increased steadily in recent years. The motor vehicle seat as well, which years ago had no electronics whatever and was merely mechanically adjustable, has, with the introduction of electronics into the motor vehicle, been provided with numerous electronic components. For instance, motor vehicle seats of the prior art have electric adjusting devices that make it possible to adjust the seat back or the entire vehicle seat by pressing a button. In association with seat adjusters of this kind, pickups (i.e. sensors) for detecting the position of the vehicle seat are disposed in the vehicle seat. Only once the current seat position is known can a preferred vehicle seat position be attained, under program control, by pressing a button.

Other electronic components disposed in or on vehicle seats are pickups for detecting seat occupation. Pickups of this kind are used particularly for front passenger seats. If it is detected by such a pickup that the front passenger seat is unoccupied, then inflation of a front passenger air bag or of a side air bag, disposed to the side of the front passenger seat, is prevented.

The electric and electronic components described in the vehicle seat serve essentially two different purposes. Seat adjusters, associated sensors, seat heaters and the like are for the comfort of the passenger seated there; pickups for detecting seat occupation or restraints disposed on the vehicle seat, such as a side air bag or belt tightener, are there for the safety of the vehicle passengers.

Every electronic component in the vehicle seat is typically supplied with energy separately. Each individual electronic component, for instance each sensor or actuator, and especially if the sensors and actuators used serve different purposes, also has its own assigned control circuit. Each control circuit, for instance in the form of a microcomputer includes its own memory, its own microprocessor, and so forth. A control circuit assigned to a sensor for instance carries out a first evaluation of the sensor signal. A control circuit assigned to an actuator serves as a final control element, for instance. With more and more electronics installed in the vehicle seat, the expense and complexity of the control circuits rises considerably, while the space available in the vehicle seat decreases.

SUMMARY OF THE INVENTION

It is accordingly an object of the invention to provide a vehicle seat with a control device which overcomes the above-mentioned disadvantages of the prior art devices of this general type, and in particular to create a control device with electronic components disposed in the vehicle seat that has only a small number of components.

With the foregoing and other objects in view there is provided, in accordance with the invention, in combination with a vehicle seat, a control device for the vehicle seat, including:

a pickup for detecting seat occupation, and/or a second pickup for detecting a position of the vehicle seat, and/or a restraint device for passenger protection, and/or a seat adjuster for adjusting the vehicle seat;

a common control circuit electrically conductively connected to the first pickup, and/or the second pickup, and/or the restraint device, and/or the seat adjuster; and an energy supply for supplying energy to the common control circuit.

According to the invention, fixed sensors and actuators disposed in a vehicle seat share a common control circuit, preferably in the form of a single microprocessor, and a common energy supply.

In an advantageous refinement, the control device, containing the fixed sensors and actuators, the common control circuit and the common energy supply, also has a common interface for coupling the control device to a data line. Thus over a single data line, preferably embodied as a data bus, all the data are transmitted from and to the control device in the vehicle seat.

The control circuit of the control device for instance evaluates sensor signals of at least one sensor disposed in the vehicle seat, or converts signals, furnished to the vehicle seat, into suitable control signals for the at least one actuator mounted in or on the vehicle seat. The control circuit can also perform diagnostic routines to check the operability of sensors and actuators disposed in the vehicle seat. The control circuit optionally serves solely to convert data, for instance from an analog data format furnished by a sensor, into a digital data format required for data transmission.

The control device of the invention, because of the common control circuit for many control events—regardless of the purpose of the control events—occupies little space, which is especially advantageous for use in the vehicle seat. The number of components is also less, compared with known control devices. Particularly when the control device is connected to a data line for serial data transmission, only little expense for cables is needed, and the flexibility of the control device, for instance when further sensors and actuators are disposed in the seat are connected to the control device, is increased. Redundant embodiments of control circuits and energy supplies in the vehicle seat are avoided. The control circuit advantageously has a common memory for data of all the electrical devices connected. The control circuit of the invention is preferably disposed on a single circuit carrier.

According to the invention, a common control circuit has the following: a pickup for detecting seat occupation and a pickup for detecting the position of the vehicle seat, or a pickup for detecting seat occupation and a seat adjuster, or a pickup for detecting seat occupation and a restraint device for passenger protection, or a restraint device for passenger protection and a seat adjuster, or a restraint device for passenger protection and a pickup for detecting the position of the vehicle seat. Each of these components is disposed in or on the vehicle seat, as is the control circuit, so that all the prerequisites for connecting the control device to a data line are also met.

Other features which are considered as characteristic for the invention are set forth in the appended claims.

Although the invention is illustrated and described herein as embodied in a vehicle seat with a control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
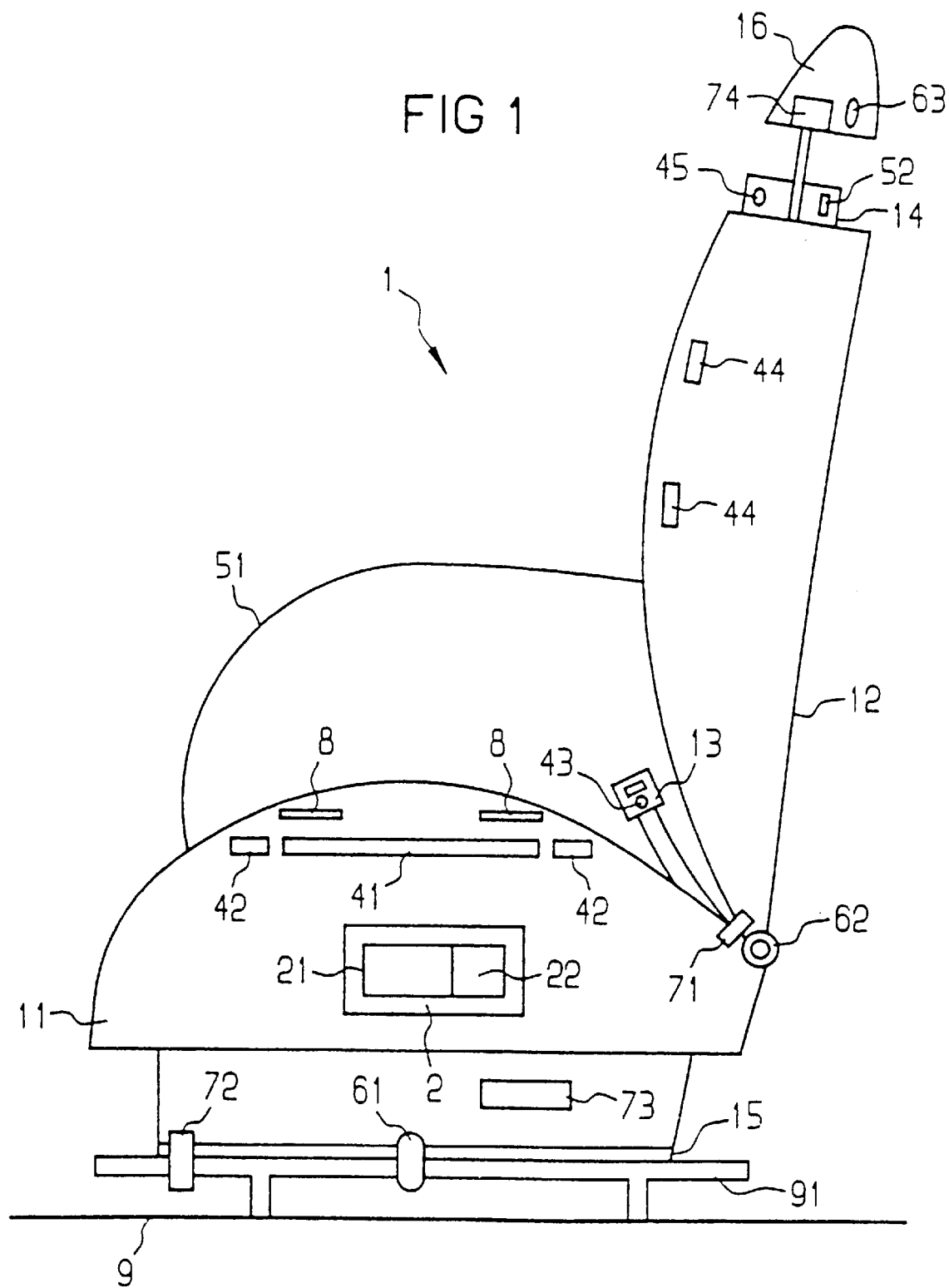
FIG. 1 is a diagrammatic, side-elevational view of motor vehicle seat with a control device according to the invention.

In all the figures of the drawing, sub-features and integral parts that correspond to one another bear the same reference symbol in each case. Referring now to the figures of the drawings in detail and first, particularly, to FIG. 1 thereof, there is shown a vehicle seat 1 with a vehicle seat body 11, a vehicle seat back 12, a belt lock 13, a belt device 14 containing a safety belt, and a headrest 16. The vehicle seat 1 is displaceably supported via a slide rail 15 on a rail 91 connected to a vehicle floor 9, so that the seat 1 is adjustable approximately in the direction of a longitudinal axis of the vehicle. A control unit 2, which has a control circuit 21 and an energy supply 22 for the control circuit 21, is disposed in the vehicle seat body 11. Coupling the control circuit 21 to other control circuits, actuators or sensors disposed outside the vehicle seat 1, and the supply line for the energy supply 2 are not shown in the drawing, for the sake of simplicity. The vehicle seat 1 has sensor devices in the safety electronics that include in particular pickups for detecting seat occupation. Such pickups include a weight sensor 41 disposed in the vehicle seat body 11, a device 42, disposed in the vehicle seat body 11 for detecting a child seat, a belt block sensor 43, capacitive sensors 44 in the seat back 12, and a sensor 45 for detecting the laid out length of a belt at the belt device 14. In terms of sensor devices that are part of the electronic system for the sake of comfort, the vehicle seat includes in particular pickups for detecting a position of the vehicle seat 1, such as a pickup 61 for detecting the position of the vehicle seat 1 along the slide rail. A pickup 62 determines the angle of inclination of the seat back 13, and a pickup 63 determines a position of the headrest 16. The vehicle seat 1 also includes actuator devices of the safety-related electronic system, such as restraint devices for passenger protection, in particular an air bag 51, which is schematically shown in the inflated state, or a belt tightener 52. Electronic actuators in the comfort system for a seat adjuster are also provided, such as a seat back adjuster 71, a position adjuster 72, a height adjuster 73, and a headrest adjuster 74. A seat heater 8 is also disposed in the seat body 11.

All the sensor devices 41-45, 61-63 and all the actuator devices 51-51, 71-74 are connected to the control circuit 21 via electrically conductive connections.

The sensor devices 41-45, 61-63 and the actuator devices 51-51, 71-74 are all known per se. The weight sensor 41 indicates what weight is being exerted on the seat body 11. The weight sensor 41 can naturally also be disposed in the seat back for picking up the force exerted on the back. The device 42 for detecting a child seat indicates whether a child seat is disposed in the vehicle seat 1, and optionally how the child seat is oriented. The belt lock sensor 43 indicates whether a safety belt has locked in the belt lock 13 or not.

The capacitive sensors 44 ascertain whether a human body is leaning back against the seat back 12. The sensor 45 for detecting the set out belt length provides information on the circumference of the person or object belted in. The pickups 41-45 for detecting seat occupation can naturally be based on different physical measurement principles.

The pickups 61-63 for detecting the position of the vehicle seat on the one hand furnish information for the comfort-related electronic system and thus make program-controlled seat settings possible. On the other, the signals of the pickups 61-63 for position detection can also be utilized to ascertain the position of the passengers.

Restraint devices 51-52 disposed on the vehicle seat 1 are currently the side air bag 51 and the belt tightener 52, in particular. These restraint devices 51-52 can be actuated under data word control. With the devices of the seat adjuster 71-74, the seat back 12 can be adjusted in its angle of inclination, the entire vehicle seat 1 can be adjusted in its position, the vehicle seat can be adjusted in height, and the headrests can be adjusted in their position.

Figure 2:
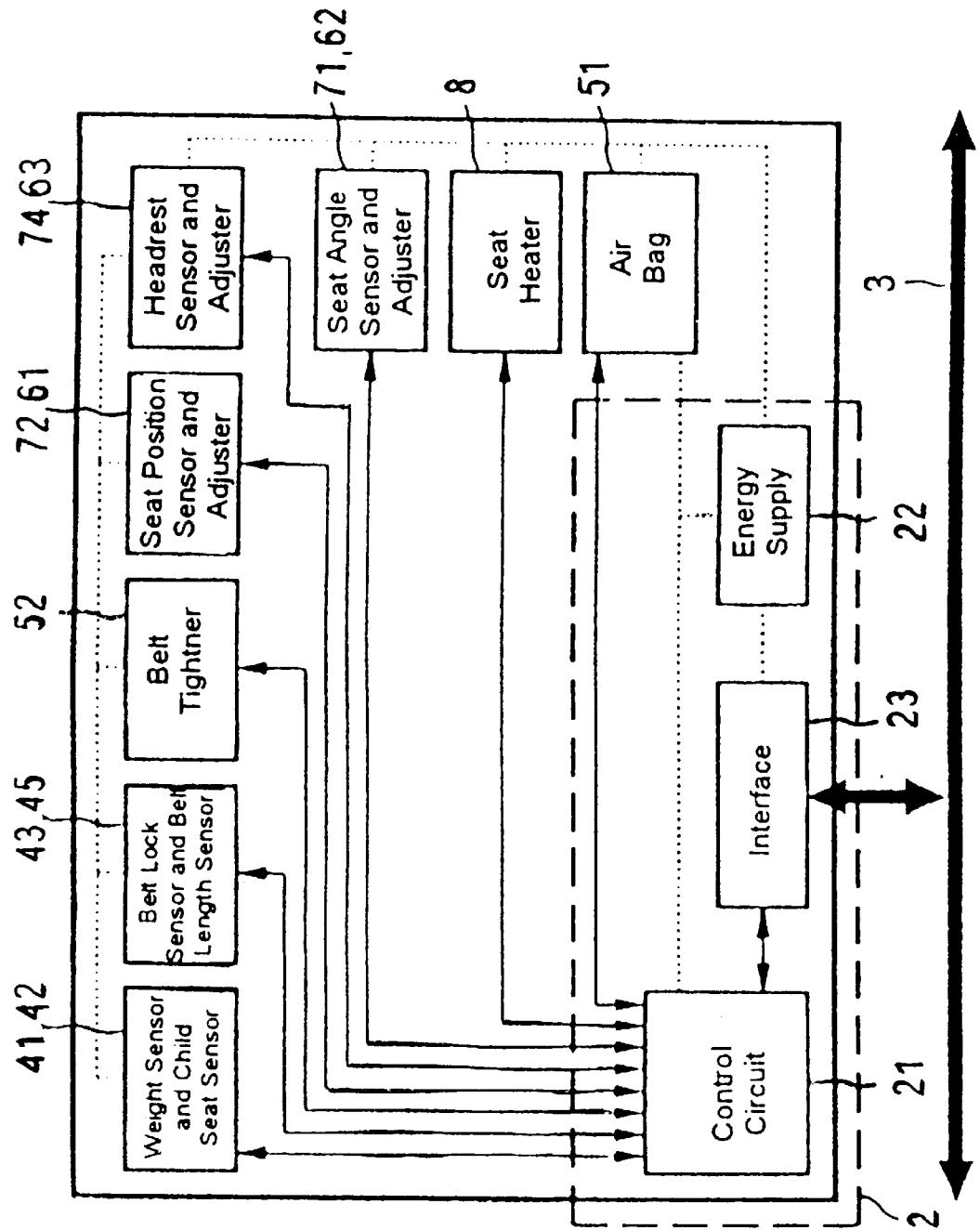
FIG. 2 is a block circuit diagram of the control device.

FIG. 2 shows a block circuit diagram of the control device of the invention. The control circuit 21, the energy supply 22, and an interface 23 with a data line 3 are disposed in a common control unit 2 with a suitable housing or means for protecting against environmental influences. The elements connected to the control unit 2 are the weight sensor 41, the device 42 for detecting a child seat, the belt lock sensor 43, the sensor for detecting the laid out belt length 45, the belt tightener 52, the air bag 51, the seat heater 8, the seat back adjuster 71, the position adjuster 72, the headrest adjuster 74, and the pickup 61 for the vehicle seat position along the slide rail, the pickup 62 for the seat back angle of inclination, and the pickup 63 for the headrest position.

If the control device of the invention has only components for passenger protection, that is, at least one pickup 41-45 for detecting seat occupation and at least one restraint device 51-52, then the control events that proceed in the common control circuit 21 are essentially independent of one another. The pickup 41-45 for detecting seat occupation as a rule furnishes its signals to a control unit 10 (FIG. 3) for passenger protection that is disposed outside the vehicle seat 1 and is electrically connected in turn to an acceleration pickup or other collision-detecting devices. Typically, the control unit sends out firing commands to individual restraint devices connected to it, such as the side air bag 51. The control circuit preferably causes the restraint device 51-52 disposed on the vehicle seat 1 to be enabled or rendered inactive, as a function of the signals of the pickup or pickups 41-45 for detecting seat occupation evaluated by the control circuit 21. To that end, the control circuit 21 furnishes a corresponding control signal to the restraint device 51-52.

In another control device of the invention, with the pickup 41-45 for detecting seat occupation and a pickup 61-63 for position detection, the passenger position can be calculated and optionally classified in the common control circuit 21 from the signals of the two pickup sets 41-45 and 61-63. For instance, via its interface 23, the control circuit 21, already feeds control signals with detailed information about the passenger position and/or the type of object, such as a child seat, disposed on the vehicle seat 1.

If in another control device of the invention the pickup 41-45 for detecting seat occupation and the seat adjuster 71-74 are disposed together with the common control circuit 21 in the vehicle seat 1. In this manner, the common control circuit 21 can on the one hand control the seat adjuster 71-74 and on the other can process or transmit signals of the pickup 41-45 for detecting seat occupation. Preferably, however, the seat adjuster 71-74 can be influenced, as a function of the signal furnished by the pickup 41-45 for detecting seat occupation, by a control signal of the control circuit 21 in such a way that for instance if a seat position that is dangerous to the passengers is detected, the vehicle seat is varied in its position, via the seat adjuster 71-74, in such a way that the passenger thereupon assumes an unobjectionable position. For instance, if the passenger is leaning far forward, then the control circuit 21 can cause the actuation of the position adjuster 72 of the vehicle seat 1 in such a way that the vehicle seat is moved into a rearward position, so that the passenger is no longer placed immediately in front of an air bag.

Figure 3:
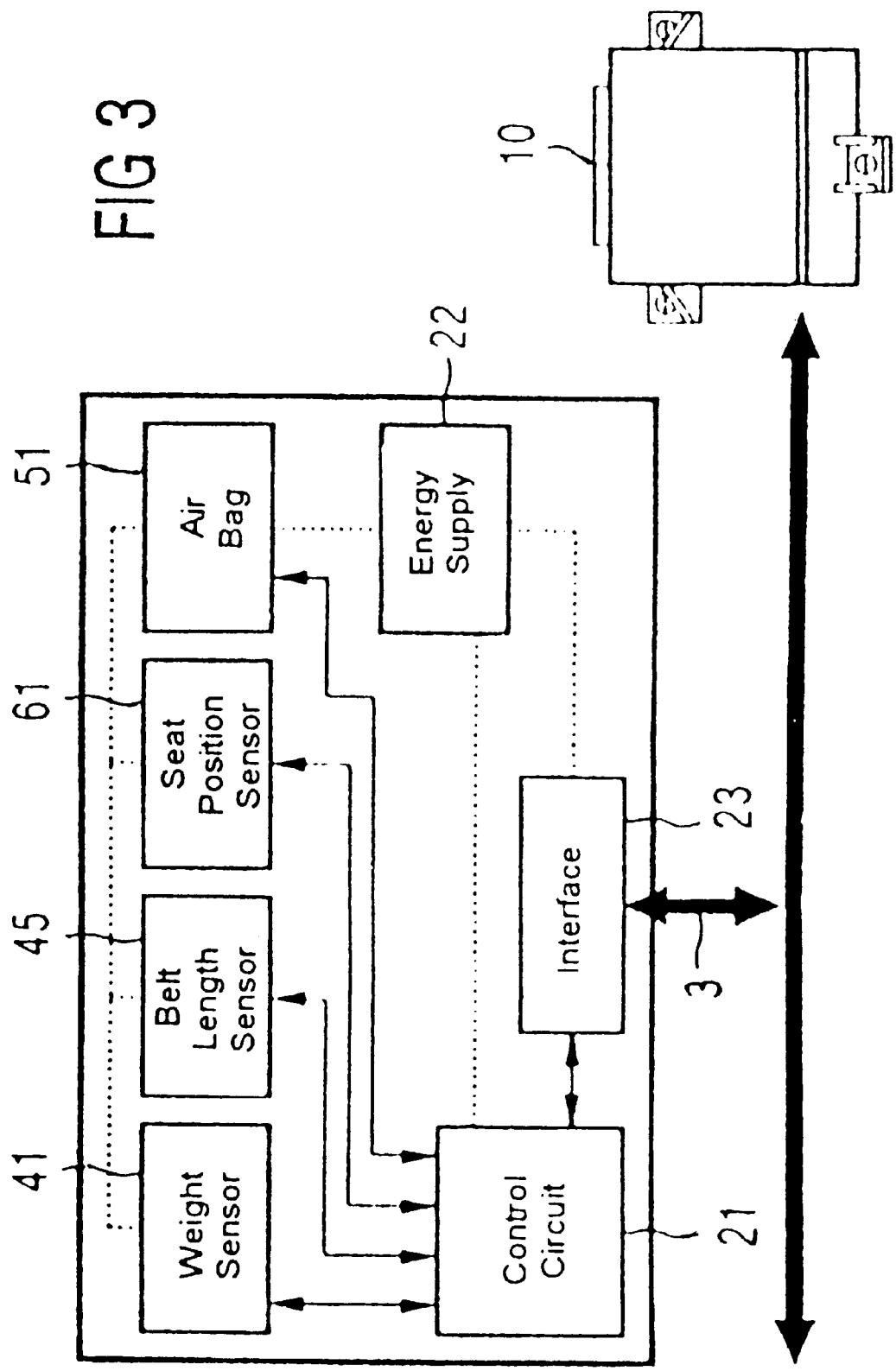
FIG. 3 is a block circuit diagram of a second embodiment of the control device.

Another control device of the invention has the restraint device 51-52 for passenger protection and the pickup 61-63 for detecting the position of the vehicle seat 1. In this control device, the restraint device 51-52 can be locked or enabled at the instigation of the control circuit 21, as a function of the vehicle seat position, which is optionally evaluated. The control device aimed at detecting passengers preferably has the following components, in a minimal configuration. The common control circuit 21 with the associated energy supply 22, the weight detector 41 connected to the control circuit, and a vehicle seat position detector. The two variables, i.e., the weight of the passenger and the position of the vehicle seat, are indispensable for calculating the position of the passenger himself. If the control device is expanded in any way, then preferably by adding a child seat detector. If the passenger position is to be determined more accurately, preferably a sensor for detecting the laid out belt length should be provided and connected electrically to the common control circuit. FIG. 3 shows one such advantageous control device, in which in addition a side air bag is disposed in the vehicle seat 1.

With the storage in memory of values for instance pertaining to the laid out belt length, the dynamics of the laid out belt length can be tracked, and thus an obese passenger, for whom over time approximately the same belt length is established, can be distinguished from a passenger who is bending forward, for whom the laid out belt length will surely change considerably over time.

We claim:

1. In combination with a vehicle seat, a control device for the vehicle seat, comprising:
    a first pickup detecting when the vehicle seat is occupied;
    a restraint device protecting a passenger;
    a second pickup for detecting a position of the vehicle seat conductively connected to said common interface;
    a common control circuit disposed in the vehicle seat electrically conductively connected to said first pickup, said second pickup, and said restraint device; and
    an energy supply supplying energy to said common control circuit.

2. The control device according to claim 1, further comprising:
    a seat adjuster adjusting the vehicle seat conductively connected to said common control circuit.

3. The control device according to claim 1, wherein said first pickup for detecting seat occupation has a weight sensor.

4. The control device according to claim 1, wherein said first pickup for detecting seat occupation has a device for detecting a child seat.

5. The control device according to claim 1, wherein said first pickup for detecting seat occupation has a belt lock sensor for a belt lock disposed on the vehicle seat.

6. The control device according to claim 1, wherein said first pickup for detecting seat occupation has a sensor for detecting a laid out belt length of a safety belt disposed on the vehicle seat.

7. The control device according to claim 1, wherein the vehicle seat has a vehicle seat rail slide, and said pickup for detecting the position of the vehicle seat has a pickup for detecting the position of the vehicle seat along the vehicle seat rail slide.

8. The control device according to claim 1, wherein the vehicle seat has a seat back, and said second pickup for detecting the position of the vehicle seat has a pickup for detecting an angle of inclination of the seat back.

9. The control device according to claim 1, wherein said common control device has an interface for a serial transmission of data over a data line.

10. The control device according to claim 1, wherein said common control circuit is a microprocessor.

* * * * *